W. RICHARDSON.
RELEASING HOOK.
APPLICATION FILED JAN. 24, 1918.
1,297,402.
Patented Mar. 18, 1919.
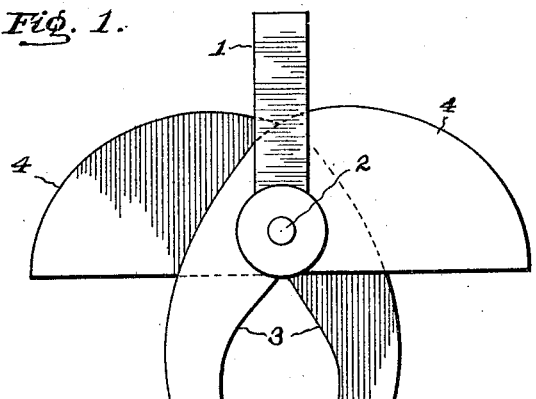
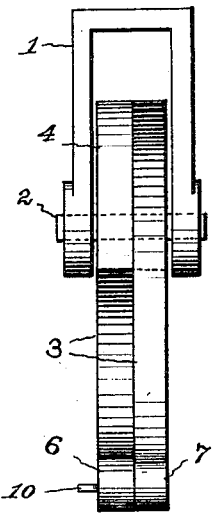
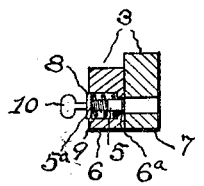
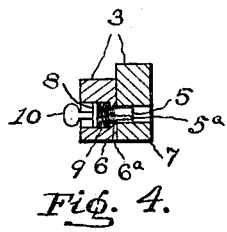
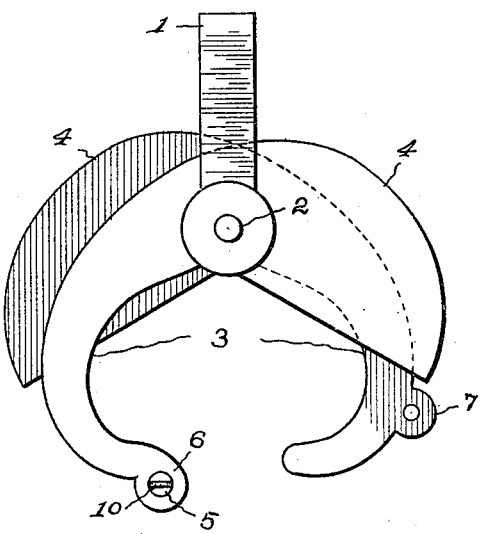
Inventor
W. Richardson
By H. S. Hill
Attorney

UNITED STATES PATENT OFFICE.

WILLIAM RICHARDSON, OF TORONTO, ONTARIO, CANADA.

RELEASING-HOOK.

1,297,402.   Specification of Letters Patent.   Patented Mar. 18, 1919.

Application filed January 24, 1918. Serial No. 213,562.

*To all whom it may concern:*

Be it known that I, WILLIAM RICHARDSON, a subject of the King of Great Britain, residing at Toronto, Province of Ontario, Dominion of Canada, have invented a new and useful Releasing-Hook; and I do hereby declare the following to be a full, clear, and exact description of the invention, such as will enable others skilled in the art to which it appertains to make and use the same.

The present invention relates to certain new and useful improvements in hoisting hooks, and has for its object to provide a hook of this character which embodies novel features of construction whereby it will automatically release the suspended object as soon as the object is lowered into engagement with a support and the downward pull upon the hook discontinued.

Further objects of the invention are to provide a hook of this character which is comparatively simple and inexpensive in its construction, which can be used in connection with the conventional block and tackle and any kind of hoisting mechanism, which is not liable to break or get out of repair, and which is thoroughly dependable in its operation.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which:—

Figure 1 is a side elevation of a hoisting hook constructed in accordance with the invention, the coöperating hook members being shown as locked in a closed position.

Fig. 2 is a similar view showing the hook members as swung into an open position.

Fig. 3 is a side view of the hoisting hook, the hook members being in a closed position.

Fig. 4 is a sectional view on the line 4—4 of Fig. 1.

Fig. 5 is a similar view with the locking bolt moved outwardly into inoperative position.

Corresponding and like parts are referred to in the following description and indicated in all the views of the drawings by the same reference characters.

Referring to the drawings, which illustrate one embodiment of the invention, the numeral 1 designates a supporting yoke which may be attached to any conventional hoisting mechanism such as the block of an ordinary tackle. The two arms of the yoke 1 are connected by a pivot pin 2 upon which the complemental hook members 3 are mounted. The pivot ends of the hook members are formed with weighted extensions 4 which project on the opposite side of the pivot pin from the hook members. When the complemental hook members 3 are swung toward each other and brought into operative position, as indicated by Fig. 1, the weighted extensions 4 project substantially horizontally from the pivot pin 2 on opposite sides thereof. When an object is suspended from the hook members 3, the pull upon the hook members will overcome the action of the weighted extensions 4 and retain the hook members in operative position. However, as soon as the object is brought into engagement with a support so that there is no longer any downward pull upon the yoke members, the weighted extensions 4 will automatically swing the hook members apart, as indicated by Fig. 2, thereby releasing the object. While the invention can be used to advantage for handling such objects as shells and forgings which must be quickly released after being lowered, it is more especially adapted for use in connection with the blocks and tackles employed for lowering life boats and rafts. When thus used, it will be obvious that as soon as the boat or raft strikes the water the hooks will automatically open and release the boat or raft, thus avoiding the danger and delay which is ordinarily incident to manually releasing the hooks by men at opposite ends of the boat or raft. It will be remembered that in rough weather the operation of manually releasing the ordinary hooks is accompanied by considerable risk and danger.

For the purpose of holding the hooks in a closed position when they are not actually to be used, a locking plunger 5 may be provided. This plunger is slidably mounted within an eye 6 at the end of one of the hook members 3, and is adapted to engage a perforated ear 7 which projects downwardly from the other hook member at a point spaced from the end thereof. The inner end of the eye 6 is contracted and threaded as indicated at 6ª, and the plunger 5 is provided at its outer end with a collar 8 which slides within the outer end of the eye, a spring 9 being interposed between the collar and the shoulder formed by the reduced inner end of the eye and normally tending to move the plunger outwardly into inoperative position. A finger piece 10 is provided at the outer end of the plunger 5, and the portion of the plunger adjacent the collar 8 is threaded, as indicated at 5ª. The spring 9 normally holds the plunger in inoperative position so that there is no danger of the plunger ever being accidentally moved into such a position as to interfere with the proper action of the hook members. However, when the device is not actually to be used, the hook members can be locked in a closed position by forcing the plunger 5 inwardly against the action of the spring 10 and screwing the threaded portion 5ª of the plunger into the threaded contracted inner end 6ª of the eye 6, as indicated by Fig. 4. In order to release the locking plunger it is merely necessary to unscrew it a sufficient amount to permit the spring 9 to function and move the plunger outwardly, as indicated by Fig. 5.

Having thus described the invention, what I claim as new and desire to secure by Letters Patent, is:—

A device of the character described including a frame, a pivot pin upon the frame, a pair of opposed and coöperating hook members pendent from the pivot pin and adapted to have the hooked ends thereof swung toward each other and brought into an overlapping relation when in operative position, the overlapping portions of the hook members being provided with corresponding openings, and one of the openings having a threaded portion, a spring actuated plunger slidably mounted within the said opening and adapted to engage the opening of the other hook member to lock the hook members in a closed position, the locking plunger being formed with a threaded portion which is adapted to engage the threaded portion of the opening to hold the plunger against movement, and weighted extensions projecting laterally from the hook members for swinging them into an open position as soon as released.

In testimony whereof I have signed my name to this specification in the presence of two subscribing witnesses.

WILLIAM RICHARDSON.

Witnesses:
 GEO. W. HIDER,
 HARRY GLENHOLME.

Copies of this patent may be obtained for five cents each, by addressing the "Commissioner of Patents Washington, D. C."